United States Patent
Hartl et al.

(10) Patent No.: US 9,975,434 B2
(45) Date of Patent: May 22, 2018

(54) SYSTEM AND METHOD FOR MONITORING CONTACTOR HEALTH

(71) Applicant: Ford Global Technologies, LLC, Dearborn, MI (US)

(72) Inventors: Derek Hartl, Royal Oak, MI (US); Ai Keramidas, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 747 days.

(21) Appl. No.: 14/034,955

(22) Filed: Sep. 24, 2013

(65) Prior Publication Data

US 2015/0088361 A1     Mar. 26, 2015

(51) Int. Cl.
| | |
|---|---|
| *B60L 3/12* | (2006.01) |
| *B60L 3/00* | (2006.01) |
| *B60L 3/04* | (2006.01) |
| *G07C 5/08* | (2006.01) |
| *H01R 43/00* | (2006.01) |
| *B60L 11/14* | (2006.01) |

(52) U.S. Cl.
CPC ............... *B60L 3/12* (2013.01); *B60L 3/0046* (2013.01); *B60L 3/04* (2013.01); *B60L 11/14* (2013.01); *G07C 5/08* (2013.01); *G07C 5/0825* (2013.01); *H01R 43/002* (2013.01); *B60L 2240/549* (2013.01); *Y02T 10/648* (2013.01); *Y02T 10/70* (2013.01); *Y02T 10/7077* (2013.01); *Y02T 90/14* (2013.01); *Y02T 90/16* (2013.01)

(58) Field of Classification Search
None
See application file for complete search history.

(56) References Cited

U.S. PATENT DOCUMENTS

| | | | | |
|---|---|---|---|---|
| 5,670,861 | A * | 9/1997 | Nor | B60L 11/185 307/10.7 |
| 7,479,711 | B2 | 1/2009 | Mack | |
| 8,427,171 | B2 * | 4/2013 | Carkner | H01M 10/486 324/538 |
| 8,808,031 | B2 * | 8/2014 | Zhao | H01M 2/206 439/620.27 |
| 2008/0074215 | A1 | 3/2008 | Zhou et al. | |

(Continued)

FOREIGN PATENT DOCUMENTS

| | | |
|---|---|---|
| JP | 03212133 | 9/1991 |
| JP | 03220471 | 9/1991 |

(Continued)

OTHER PUBLICATIONS

12 Volt Smart Battery Isolator With 150+ AMPS Pass-Through and Solid-State Control; Power Stream Technology; http://www.powerstream.com/battery-isolator.htm.

*Primary Examiner* — Shelley Chen
(74) *Attorney, Agent, or Firm* — Carlson, Gaskey & Olds (57) ABSTRACT

A method for monitoring contactor health according to an exemplary aspect of the present disclosure includes, among other things, storing wear data associated with a contactor, categorizing the wear data into at least a first bin and a second bin, assigning a first health level to the wear data associated with the first bin and assigning a second health level to the wear data associated with the second bin. Health information concerning the contactor is communicated to the vehicle operator.

16 Claims, 4 Drawing Sheets

(56) References Cited

U.S. PATENT DOCUMENTS

| | | | | |
|---|---|---|---|---|
| 2011/0298472 A1* | 12/2011 | Carkner | ............. | H01M 10/486 |
| | | | | 324/538 |
| 2012/0105065 A1* | 5/2012 | Namou | ............. | G01R 31/3275 |
| | | | | 324/415 |
| 2013/0038341 A1* | 2/2013 | Flack | ................. | G01R 27/205 |
| | | | | 324/713 |
| 2013/0101883 A1* | 4/2013 | Zhao | ..................... | H01M 2/26 |
| | | | | 429/121 |
| 2013/0288530 A1* | 10/2013 | Zhao | ................... | H01M 2/206 |
| | | | | 439/627 |
| 2015/0270731 A1* | 9/2015 | Adelmann | ............... | H02J 7/35 |
| | | | | 320/101 |

FOREIGN PATENT DOCUMENTS

| | | | |
|---|---|---|---|
| JP | 03220471 A | * | 9/1991 |
| JP | 2010071991 A | | 4/2010 |
| KR | 20080071100 | | 8/2008 |

* cited by examiner

SYSTEM AND METHOD FOR MONITORING CONTACTOR HEALTH

TECHNICAL FIELD

This disclosure relates to electric vehicles, and more particularly, but not exclusively, to a system and method for monitoring the health of a contactor of an electric vehicle battery.

BACKGROUND

Hybrid electric vehicles (HEV's), plug-in hybrid electric vehicles (PHEV's), battery electric vehicles (BEV's) and other known electrified vehicles differ from conventional motor vehicles in that they employ one or more electric machines in addition to an internal combustion engine to drive the vehicle. These electric vehicles may also be equipped with a battery that stores electrical power for powering the electric machines. In some vehicles, an electric machine may also be employed as a generator that is powered by the internal combustion engine in order to generate electrical power to charge the battery.

Electric vehicle batteries typically utilize contactors to connect/disconnect the high voltage current generated in the battery from loads in order to prevent current overloading. For example, the contactors may act as high voltage relays for switching supply currents communicated to the electric machines. Two or more contactors are often used within a battery as a redundant measure for addressing potential unknown usages and wear conditions.

SUMMARY

A method for monitoring contactor health according to an exemplary aspect of the present disclosure includes, among other things, storing wear data associated with a contactor, categorizing the wear data into at least a first bin and a second bin, assigning a first health level to the wear data associated with the first bin and assigning a second health level to the wear data associated with the second bin. Health information concerning the contactor is communicated to the vehicle operator.

In a further non-limiting embodiment of the foregoing method, the method includes counting the wear data stored in each of the first bin and the second bin.

In a further non-limiting embodiment of either of the foregoing methods, the wear data includes at least current running through a high voltage line of the contactor.

In a further non-limiting embodiment of any of the foregoing methods, the method includes accumulating currents of less than or equal to 2.5 amps in the first bin and accumulating currents of greater than 2.5 amps in at least the second bin.

In a further non-limiting embodiment of any of the foregoing methods, the method includes accumulating currents between 2.5 amps and 50 amps in the second bin, accumulating currents between 50 amps and 100 amps in a third bin and accumulating currents of greater than 100 amps in a fourth bin.

In a further non-limiting embodiment of any of the foregoing methods, the first health level is different from the second health level.

In a further non-limiting embodiment of any of the foregoing methods, the second health level indicates a higher degree of wear compared to the first health level.

In a further non-limiting embodiment of any of the foregoing methods, the method includes commanding a first action specific to the first bin in response to the wear data in the first bin exceeding a first threshold.

In a further non-limiting embodiment of any of the foregoing methods, the method includes commanding a second action specific to the second bin in response to the wear data stored in the second bin exceeding a second threshold.

In a further non-limiting embodiment of any of the foregoing methods, the first action includes communicating a diagnostic trouble code to a customer.

In a further non-limiting embodiment of any of the foregoing methods, the first action includes at least one of setting a diagnostic trouble code, lighting an instrument panel warning light, reducing power limits of a vehicle associated with the contactor and preventing restart of the vehicle.

A method for monitoring contactor health according to an exemplary aspect of the present disclosure includes, among other things, storing wear data of a contactor in a plurality of bins, counting the wear data stored in each of the plurality of bins and commanding an action specific to each of the plurality of bins in response to the counted wear data in each of the plurality of bins exceeding a threshold to communicate health information of the contactor to a customer.

In a further non-limiting embodiment of the foregoing method, the storing includes categorizing the wear data of the contactor into the plurality of bins.

In a further non-limiting embodiment of either of the foregoing methods, the wear data includes at least current running through a high voltage line of the contactor.

In a further non-limiting embodiment of any of the foregoing methods, the method of counting includes calculating a first total of the wear data stored in a first bin of the plurality of bins and calculating a second total of the wear data stored a second bin of the plurality of bins.

In a further non-limiting embodiment of any of the foregoing methods, the method of commanding includes at least one of setting a diagnostic trouble code, lighting an instrument panel warning light, reducing power limits of a vehicle associated with the contactor and preventing restart of the vehicle.

In a further non-limiting embodiment of any of the foregoing methods, the method includes assigning a health level to the wear data associated with each of the plurality of bins.

A health monitoring system for an electric vehicle according to an exemplary aspect of the present disclosure includes, among other things, a contactor, a sensor that monitors at least a current through the contactor and a control unit in communication with the sensor; the control unit configured to store wear data associated with the contactor and command an action specific to each of a plurality of categories of the wear data.

In a further non-limiting embodiment of the foregoing system, the wear data includes current running through a high voltage power line of the contactor.

In a further non-limiting embodiment of either of the foregoing systems, the control unit is configured to store the wear data in a histogram.

The various features and advantages of this disclosure will become apparent to those skilled in the art from the following detailed description. The drawings that accompany the detailed description can be briefly described as follows.

DETAILED DESCRIPTION

This disclosure relates to a system and method for monitoring contactor health. The systems and methods disclosed herein track and store cumulative wear data associated with a contactor and selectively command an action specific to each category of wear data in order to communicate health information concerning the contactor to a customer. Incorporation of the subject health monitoring system may eliminate the necessity for redundant contactors, thereby providing a relatively significant cost savings.

Figure 1:
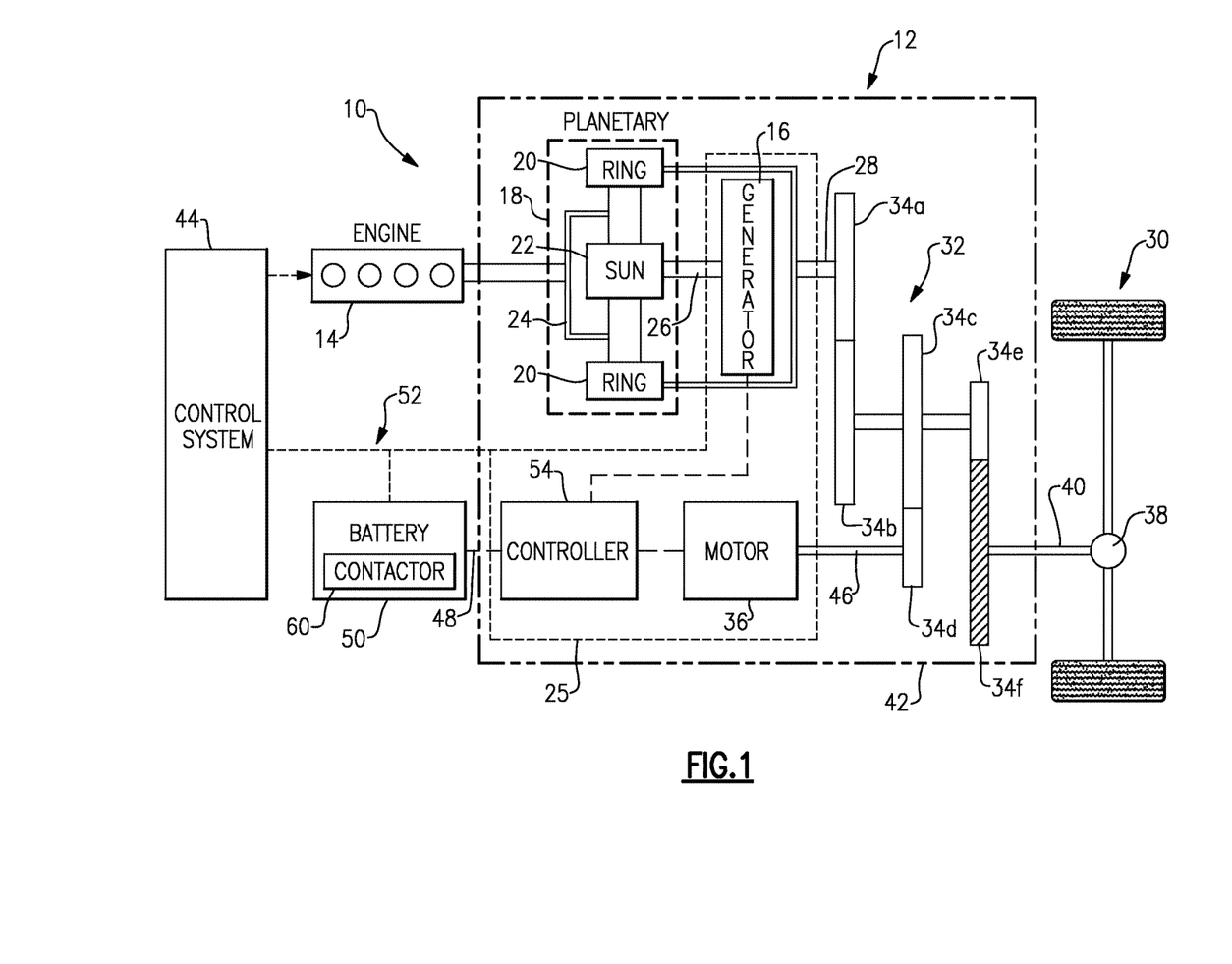
FIG. 1 schematically illustrates a powertrain of an electric vehicle.

FIG. 1 schematically illustrates a powertrain 10 for an electric vehicle 12, such as a hybrid electric vehicle (HEV). Although depicted as a HEV, it should be understood that the concepts described herein are not limited to HEV's and could extend to other electrified vehicles, including but not limited to, plug-in hybrid electric vehicles (PHEV's) and battery electric vehicles (BEV's).

In one embodiment, the powertrain 10 is a powersplit powertrain system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electric vehicle 12, as discussed in greater detail below.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery 50. The battery 50 may be a high voltage battery that is capable of outputting electrical power to operate the motor 36 and the generator 16. Other types of energy storage devices and/or output devices can also be incorporated for use with the electric vehicle 12.

The motor 36, the generator 16, the power transfer unit 18, and the power transfer unit 32 may generally be referred to as a transaxle 42, or transmission, of the electric vehicle 12. Thus, when a driver selects a particular shift position, the transaxle 42 is appropriately controlled to provide the corresponding gear for advancing the electric vehicle 12 by providing traction to the vehicle drive wheels 30.

The powertrain 10 may additionally include a control system 44 for monitoring and/or controlling various aspects of the electric vehicle 12. For example, the control system 44 may communicate with the electric drive system 25, the power transfer units 18, 32 or other components to monitor and/or control the electric vehicle 12. The control system 44 includes electronics and/or software to perform the necessary control functions for operating the electric vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 may also communicate with a battery control module of the battery 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

The battery 50 may include at least one contactor 60 for selectively opening and closing a connection between the battery 50 and the electric machines 16, 36 or other loads of the electric vehicle 12. In one embodiment, the contactor 60 acts as a high voltage relay for electronically switching a supply current to various loads of the electric vehicle 12. For example, the contactor 60 may couple or decouple the high voltage power generated in the battery 50 to or from the electric machines 16, 36. When in a closed position, the contactor 60 couples the battery 50 to the electric machines 16, 36 over the high voltage bus 48. Alternatively, when the contactor 60 is in an open position, the battery 50 is decoupled from the electric machines 16, 36.

Figure 2:
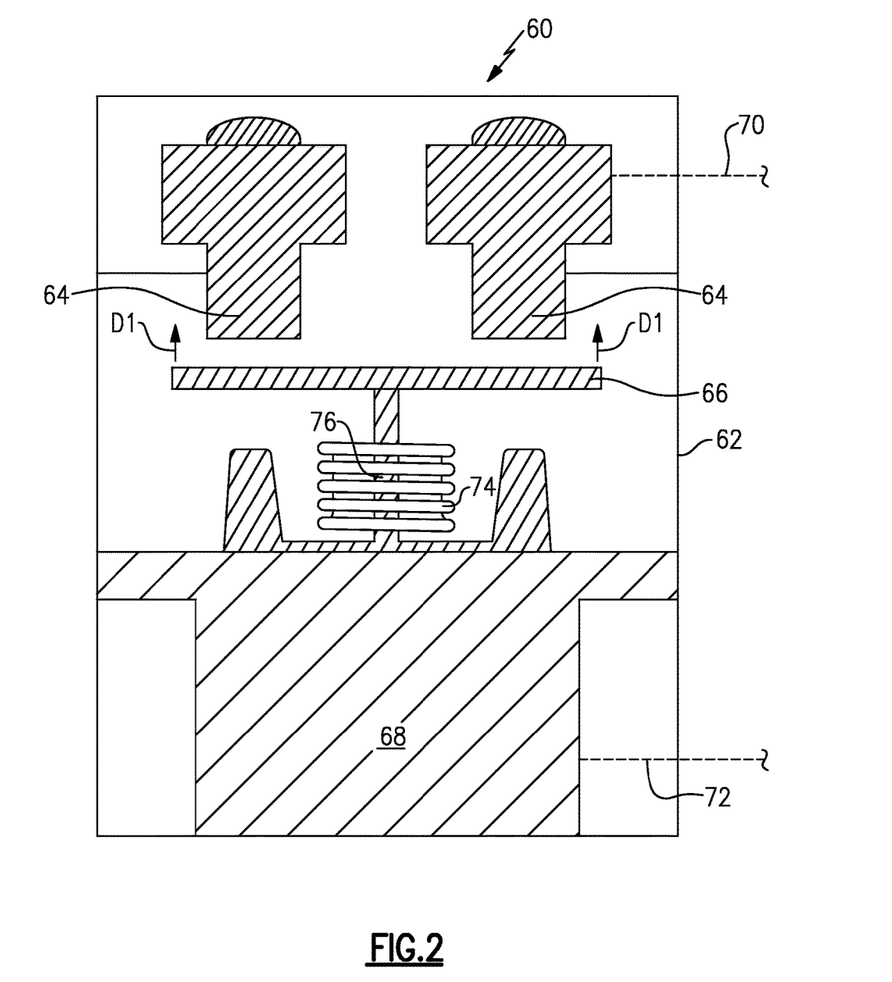
FIG. 2 illustrates a contactor that can be incorporated into a battery of an electric vehicle.

FIG. 2 illustrates a cross-sectional view of a non-limiting embodiment of a contactor 60 that may be employed within a battery, such as the battery 50 of the electric vehicle 12 of FIG. 1 or any other battery. The contactor 60 includes a housing 62, at least one stationary contact 64 (two shown in FIG. 2), at least one moveable contact 66 and a coil 68. The stationary contacts 64, the moveable contact 66 and the coil 68 are each housed inside of the housing 62. Other components may additionally be housed by the housing 62. It should be understood that the contactor 60 could include any internal design/architecture.

The contactor 60 is depicted in an open configuration in which the movable contact 66 is spaced from the stationary contacts 64 and therefore the battery 50 (see FIG. 1) is decoupled from its various loads. In one embodiment, the movable contact 66 is biased in a direction away from the stationary contacts 64 by a spring 74. The spring 74 is carried by a guide post 76.

In order to close the contactor 60, the coil 68 may be energized by a current communicated through a low voltage power line 72 to translate the moveable contact 66 in a direction D1 toward the stationary contacts 64. The contactor 60 may be closed in response to a vehicle-on condition or any other condition. The movable contact 66 is guided towards the stationary contacts 64 by the guide post 76. Once the contactor 60 is closed, current flows through a high voltage power line 70 to power one or more loads (e.g., the motor 36, the controller 54, etc.) of the electric vehicle 12.

The contactor 60 may undergo aging, such as contact surface erosion, friction, jamming, contact welding, debris, or other wear, each time it is cycled between open and closed positions. Therefore, it may be beneficial to monitor the health of the contactor 60 in order to replace the contactor 60 prior to the expiration of its usable life.

Figure 3:
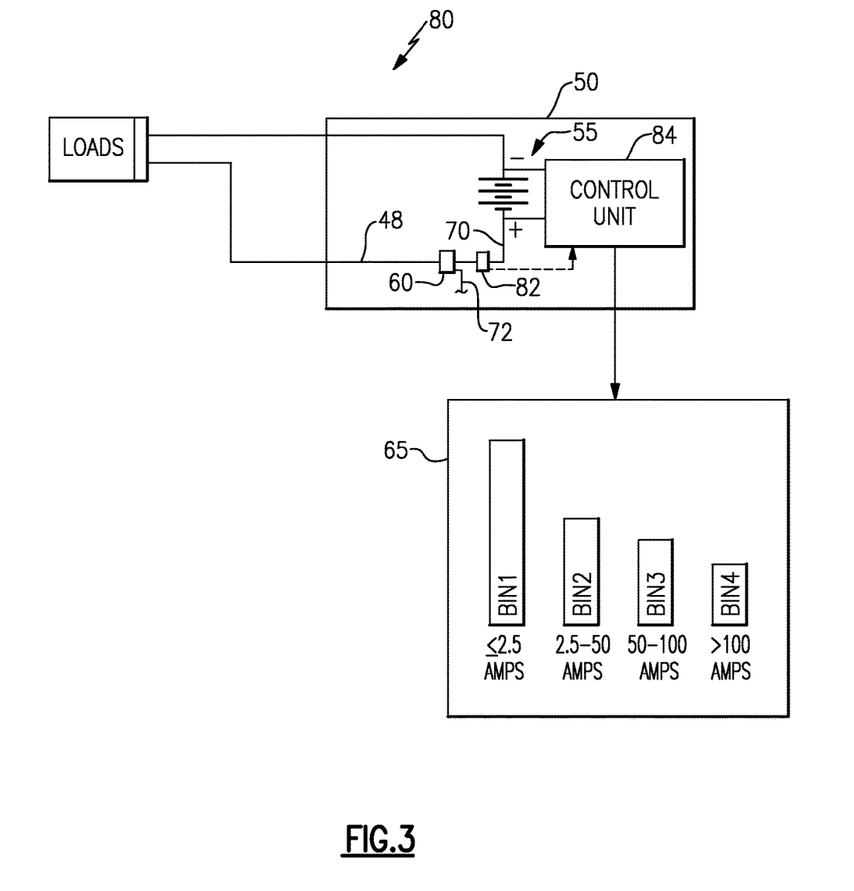
FIG. 3 illustrates a contactor health monitoring system.

FIG. 3 illustrates a health monitoring system 80 that can be incorporated into an electric vehicle battery 50. The health monitoring system 80 monitors the health of the contactor 60. In one embodiment, the health monitoring system 80 tracks and stores cumulative wear data associated with the contactor 60 and selectively commands an action specific to each of several categories of wear data to communicate health information concerning the contactor 60 to a customer. The health monitoring system 80 is also capable of assigning health levels of escalating degrees of contactor wear to each category of wear data. These and other features of the health monitoring system 80 are discussed in greater detail below.

In one embodiment, the health monitoring system 80 includes at least a sensor 82 and a control unit 84. The sensor 82 is positioned between the contactor 60 and at least one battery cell 55 of the battery 50. The sensor 82 could be positioned at other locations relative to the contactor 60. The battery 50 could include any number of battery cells 55.

The sensor 82 senses wear data associated with the contactor 60. In one embodiment, the sensor 82 is a current sensor and the wear data includes at least current running through a high voltage power line 70 connected to the contactor 60. The sensor 82 may additionally or alternatively collect other wear data or information, including but not limited to voltage, power, energy and temperature information.

The sensor 82 communicates with the control unit 84. The wear data sensed by the sensor 82 may be communicated to the control unit 84 for subsequent analysis. The control unit 84 tracks and stores the wear data associated with the contactor 60. The health monitoring system 80 may be programmed with one or more algorithms configured to monitor and store the cumulative wear data associated with the contactor 60 and command actions specific to each category of wear data in order to communicate health information of the contactor 60 to a customer. In one embodiment, the control unit 84 of the health monitoring system 80 is programmed with the algorithms and the logic necessary to execute these algorithms.

The control unit 84 may categorize the wear data communicated from the sensor 82. In one embodiment, the control unit 84 uses a histogram 65 to store and categorize the wear data into a plurality of bins (i.e., categories). The histogram 65 is a graphical representation of the wear data and is shown for illustrative purposes to describe some of the functionality of the control unit 84. In the illustrated embodiment, the histogram 65 includes a total of four bins, labeled bin 1, bin 2, bin 3 and bin 4. In an alternative embodiment, the wear data is categorized into as little as two bins. It should be appreciated that the control unit 84 may categorize the wear data sensed by the sensor 82 into any number of bins.

In one embodiment, if current (measured through the high voltage power line 70) is less than 2.5 amps (as sensed by the sensor 82) then this event is accumulated as one "cycle" in bin 1. Similarly, currents of between 2.5 amps and 50 amps are accumulated as cycles in bin 2, currents between 50 amps and 100 amps are accumulated in bin 3, and currents greater than 100 amps are stored in bin 4. In other words, additional wear data is stored by the control unit 84 each time the sensor 82 measures a current cycle. In this disclosure, the term "current cycle" means the current at the time that the contactor 60 is opened.

The number of current cycles accumulated in each of bin 1, bin 2, bin 3 and bin 4 may be periodically counted. A specific action may be commanded by the health monitoring system 80 in response to a total of the counted wear data stored in each bin exceeding a predetermined threshold stored in the control unit 84 in order to communicate contactor 60 health information to a customer. This is discussed in greater detail below with respect to FIG. 4.

The control unit 84 may additionally be configured to assign varying health levels to the wear data associated with each of bin 1, bin 2, bin 3 and bin 4. For example, a first health level may be associated with wear data stored in bin 1, a second health level may be associated with the wear data of bin 2, a third health level may be assigned to the wear data stored in bin 3 and a fourth health level may be associated with the wear data stored in bin 4. These health levels are different from one another, in one embodiment. In another embodiment, the health levels indicate escalating degrees of contactor 60 wear, with the first health level signifying the least amount of contactor 60 wear and the fourth health level signifying the greatest or most severe amount of contactor 60 wear.

In yet another embodiment, the health levels assigned to each of bin 1, bin 2, bin 3 and bin 4 are health risk levels indicating an amount of risk of contractor 60 failure. For example, the first health level assigned to bin 1 may indicate a low failure risk, the second health level associated with bin 2 may indicate a medium failure risk, the third health level assigned to bin 3 may indicate a high failure risk and the fourth health level associated with bin 4 may indicate a severe risk of contactor 60 failure.

Figure 4:
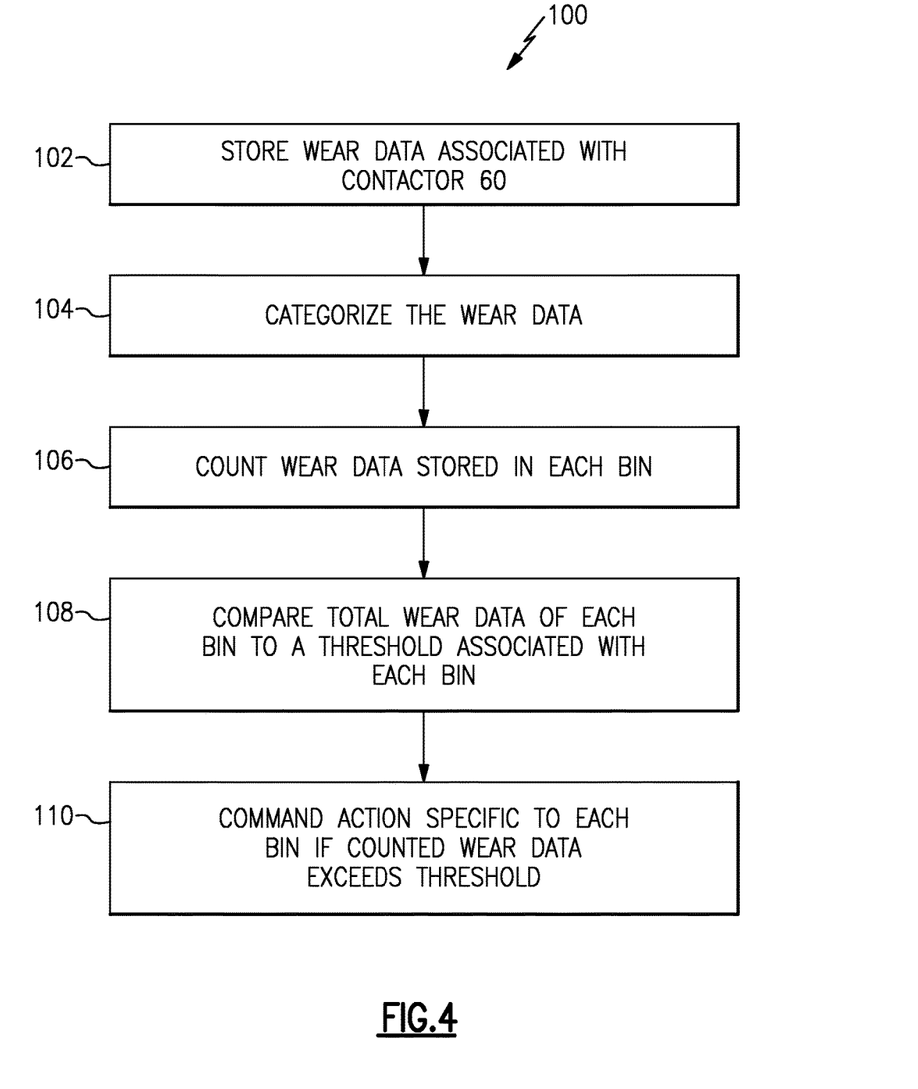
FIG. 4 schematically illustrates a method for monitoring contactor health.

FIG. 4, with continued reference to FIGS. 1-3, schematically illustrates one exemplary method 100 for monitoring the health of a contactor 60. Execution of the method 100 may enable elimination of redundant contactors used inside of a battery 50 of an electric vehicle 12. Eliminating redundant contactors results in a relatively significant cost savings per electric vehicle battery.

The method 100 begins at step 102 by storing wear data associated with a contactor 60. Among other information, the wear data may include current cycles communicated through the high voltage power line 70 of the contactor 60. The wear data is sensed by the sensor 82 of the health monitoring system 80 and is communicated to the control unit 84. In one embodiment, the wear data is sensed by the sensor 82 in response to each vehicle-on event. In another embodiment, the wear data is sensed by the sensor 82 each time the contactor 60 cycles between open and closed position (or vice versa). In yet another embodiment, the sensor 82 is programmable to periodically sense the wear data.

At step 104, the control unit 84 categorizes the wear data. In one embodiment, the wear data is categorized into at least a first bin and a second bin (see, for example, bin 1 and bin 2 of FIG. 3). The wear data may be categorized based on a magnitude of the current cycle sensed by the sensor 82. For example, each current cycle of less than or equal to 2.5 amps may be stored in the first bin, and each current cycle of greater than 2.5 amps may be stored in the second bin where only two bins are utilized. The wear data may be categorized based on any current cycle magnitudes and this disclosure is not limited to the exact categorization described above.

In another embodiment, the wear data is categorized into a plurality of bins (see, for example, bin 1, bin 2, bin 3 and bin 4 of FIG. 3). In such a configuration, the wear data may be categorized based on current cycle magnitude by storing each current cycle of less than 2.5 amps in bin 1, each current cycle between 2.5 amps and 50 amps in bin 2, each current cycle between 50 amps and 100 amps in bin 3, and each current cycle greater than 100 amps in bin 4. It is contemplated that the wear data can be categorized in other ways including ways that do not rely on current cycle magnitude.

At step 106, the wear data stored in each of the plurality of bins is counted or summed to determine a total of the wear data stored in each bin. This counting step can be performed periodically or each time the contactor 60 is cycled from on to off or off to on. In another embodiment, the wear data is counted each time new wear data is stored and categorized during steps 102 and 104.

The total wear data stored in each bin is compared to a threshold at step 108. Each bin may have a unique threshold value associated with the wear data of that bin. For example, in an embodiment that utilizes four bins, a first threshold is associated with bin 1, a second threshold is associated with bin 2, a third threshold is associated with bin 3 and a fourth threshold is associated with bin 4. In one non-limiting embodiment, the first threshold is set at 250,000, the second threshold is set at 5, the third threshold is set at 2 and the fourth threshold is set at 0. Of course, the control unit 84 can be programmed to associate any threshold value with each bin.

Finally, at step 110, an action specific to each of the plurality of bins is commanded in response to the counted wear data exceeding the threshold during the comparison of these values at step 108. Commanding such an action communicates health information concerning the contactor 60 to a customer, such as a vehicle operator.

In one embodiment, step 110 includes communicating a diagnostic trouble code to the control system 44 of the electric vehicle 12. This action may be performed for bins that are assigned a low health risk level. In another embodiment, step 110 includes actuating an instrument panel warning light to signify to a customer that service of the electric vehicle 12 is required. In yet another example, step 110 includes reducing power limits of a vehicle associated with the contactor 60. In still another embodiment, step 110 includes preventing restart of the vehicle.

As can be appreciated, the action that is commanded during step 110 can be progressively escalated until a no restart is required. In other words, each progressively escalated action may be performed in response to a greater amount of wear on the contactor 60.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
a battery cell;
a contactor configured to selectively disconnect said battery cell from a load; and
a health monitoring system including:
a sensor that monitors at least a current through said contactor; and
a control unit in communication with said sensor; said control unit configured to store wear data associated with said contactor and command an action specific to each of a plurality of categories of said wear data.

2. The electrified vehicle as recited in claim 1, wherein said wear data includes current running through a high voltage power line of said contactor.

3. The electrified vehicle as recited in claim 1, wherein said control unit is configured to store said wear data in a histogram.

4. The electrified vehicle as recited in claim 1, wherein said contactor includes a housing, a stationary contact, a moveable contact and a coil.

5. The electrified vehicle as recited in claim 4, wherein said moveable contact is moveable between a first position in which said moveable contact is spaced from said stationary contact to decouple said contactor from a load and a second position in which said moveable contact is received against said stationary contact to couple said contactor to said load.

6. The electrified vehicle as recited in claim 1, wherein said sensor is positioned between said contactor and said battery cell.

7. The electrified vehicle as recited in claim 1, wherein said sensor is configured to sense said current running through a high voltage power line connected to said contactor.

8. The electrified vehicle as recited in claim 1, wherein said control unit is configured to categorize said wear data into a plurality of bins.

9. The electrified vehicle as recited in claim 8, wherein said control unit is configured to assign a first health level to said wear data associated with a first bin of said plurality of bins and assign a second health level to said wear data associated with a second bin of said plurality of bins.

10. The electrified vehicle as recited in claim 9, wherein said first health level is different from said second health level.

11. The electrified vehicle as recited in claim 1, wherein said control unit is configured to store an additional value of said wear data each time said sensor measures a current cycle.

12. The electrified vehicle as recited in claim 1, wherein said control unit is configured to compare said wear data for each of said plurality of categories of said wear data with a threshold.

13. The electrified vehicle as recited in claim 1, wherein said action includes communicating a diagnostic trouble code to a customer.

14. The electrified vehicle as recited in claim 1, wherein said action includes actuating an instrument panel warning light.

15. The electrified vehicle as recited in claim 1, wherein said action includes reducing power limits of the electric vehicle.

16. The electrified vehicle as recited in claim 1, wherein said action includes preventing restart of the electric vehicle.

\* \* \* \* \*